(12) United States Patent
Cornelius et al.

(10) Patent No.: US 11,784,731 B2
(45) Date of Patent: Oct. 10, 2023

(54) MULTI-PHASE-LEVEL SIGNALING TO IMPROVE DATA BANDWIDTH OVER LOSSY CHANNELS

(71) Applicant: Apple Inc., Cupertino, CA (US)

(72) Inventors: William P. Cornelius, Saratoga, CA (US); Seungyong Baek, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/196,363

(22) Filed: Mar. 9, 2021

(65) Prior Publication Data

US 2022/0294545 A1 Sep. 15, 2022

(51) Int. Cl.
*H04B 17/309* (2015.01)

(52) U.S. Cl.
CPC .................................. *H04B 17/309* (2015.01)

(58) Field of Classification Search
CPC ...................................................... H04B 17/309
See application file for complete search history.

(56) References Cited

U.S. PATENT DOCUMENTS

| | | | | |
|---|---|---|---|---|
| 3,449,379 A * | 6/1969 | Cescon | ............... | G03C 1/732 430/338 |
| 4,001,732 A * | 1/1977 | Gundry | ............... | H03B 5/24 330/141 |
| 4,005,274 A * | 1/1977 | Vagliani | ............... | H04B 14/048 375/243 |
| 4,677,506 A * | 6/1987 | Kaneko | ............... | G11B 5/59611 |
| 4,882,762 A * | 11/1989 | Waldhauer | ............... | H04R 25/356 455/72 |
| 5,239,561 A * | 8/1993 | Wong | ............... | H03L 7/085 331/25 |
| 6,567,987 B1 * | 5/2003 | Farhan | ............... | H04B 10/691 725/127 |
| 6,914,559 B2 * | 7/2005 | Marks | ............... | G01S 3/48 342/430 |
| 7,224,737 B2 * | 5/2007 | Voutilainen | ............... | H04L 25/4917 332/115 |
| 8,995,842 B1 * | 3/2015 | Kojima | ............... | H04B 10/70 398/118 |
| 9,143,369 B2 * | 9/2015 | He | ............... | H04L 25/03878 |
| 9,507,135 B2 * | 11/2016 | Iketaki | ............... | G02B 21/0032 |
| 9,521,021 B2 * | 12/2016 | He | ............... | H04L 25/03343 |
| 9,917,663 B2 * | 3/2018 | Takatori | ............... | H04B 17/103 |
| 11,018,656 B1 * | 5/2021 | Sun | ............... | H04L 25/03057 |
| 11,240,077 B2 * | 2/2022 | Lee | ............... | H04L 25/493 |
| 11,308,415 B2 * | 4/2022 | Verdon-Akzam | ... | H03M 1/1245 |
| 11,405,111 B2 * | 8/2022 | Sugimoto | ............... | H03F 3/45475 |

(Continued)

FOREIGN PATENT DOCUMENTS

| | | | | |
|---|---|---|---|---|
| BR | 9917663 B1 * | 2/2011 | ............... | E21B 23/006 |
| CN | 103597801 A * | 2/2014 | ............... | G06F 1/30 |

(Continued)

*Primary Examiner* — Berhanu Tadese
(74) *Attorney, Agent, or Firm* — KILPATRICK TOWNSEND & STOCKTON, LLP

(57) ABSTRACT

Circuits, methods, and apparatus that provide improved data encoding for data transmitted through a channel of limited bandwidth. One example can provide circuits, signaling methods, and apparatus that can encode data to more fully utilize a bandwidth of a physical channel. This encoding can help to increase a data rate through the physical channel.

20 Claims, 14 Drawing Sheets

(56) References Cited

U.S. PATENT DOCUMENTS

| | | | |
|---|---|---|---|
| 2003/0152154 A1* | 8/2003 | Johnson | H04L 25/493 375/259 |
| 2005/0078712 A1* | 4/2005 | Voutilainen | H04L 25/4917 370/535 |
| 2009/0281781 A1* | 11/2009 | Rose | G06F 11/261 703/14 |
| 2011/0261871 A1* | 10/2011 | Staszewski | H03L 7/0991 375/224 |
| 2015/0034810 A1* | 2/2015 | Iketaki | G02B 21/0076 250/225 |
| 2017/0317855 A1* | 11/2017 | Shokrollahi | H04L 25/4919 |
| 2018/0048401 A1* | 2/2018 | Takatori | H04B 17/14 |
| 2021/0242861 A1* | 8/2021 | Sun | H04B 3/04 |
| 2022/0294545 A1* | 9/2022 | Cornelius | H04L 5/0044 |

FOREIGN PATENT DOCUMENTS

| | | | | |
|---|---|---|---|---|
| CN | 103356221 B | * | 3/2016 | G06K 9/624 |
| CN | 104050122 B | * | 7/2017 | H04L 25/03343 |
| CN | 109347634 A | * | 2/2019 | H04B 10/70 |
| CN | 107959563 B | * | 11/2019 | G06F 13/40 |
| CN | 112529203 A | * | 3/2021 | G06N 10/00 |
| CN | 112884154 A | * | 6/2021 | |
| CN | 113052317 A | * | 6/2021 | G06N 10/00 |
| EP | 3449379 A1 | * | 3/2019 | H04L 25/0272 |
| EP | 3449379 A4 | * | 11/2019 | H04L 25/0272 |
| EP | 3449379 B1 | * | 10/2021 | H04L 25/0272 |
| FR | 2772765 A1 | * | 6/1999 | C07D 491/04 |
| JP | 03017254 A | * | 1/1991 | |
| JP | 07231555 A | * | 8/1995 | |
| JP | 3449379 B2 | * | 9/2003 | |
| JP | 4195193 B2 | * | 12/2008 | H04B 1/123 |
| JP | 4731774 B2 | * | 7/2011 | G10L 19/0208 |
| WO | WO-1989008353 A1 | * | 9/1989 | |
| WO | WO-9917663 A1 | * | 4/1999 | |
| WO | WO-0029708 A2 | * | 5/2000 | E21B 23/006 |
| WO | WO-0049808 A1 | * | 8/2000 | H04B 10/691 |
| WO | WO-03017254 A1 | * | 2/2003 | |
| WO | WO-03050942 A1 | * | 6/2003 | |
| WO | WO-2005045459 A2 | * | 5/2005 | |
| WO | WO-2021067960 A1 | * | 4/2021 | |
| WO | WO-2021086625 A1 | * | 5/2021 | |

* cited by examiner

EXAMPLE OF SERIES TRANSITIONS WITH CONCURRENT TRANSITION

EXAMPLE OF CONCURRENT TRANSITIONS

MULTI-PHASE-LEVEL SIGNALING TO IMPROVE DATA BANDWIDTH OVER LOSSY CHANNELS

BACKGROUND

Computers and computing devices, such as laptops, all-in-one computers, smartphones, tablets, and other devices, perform data operations using binary data. Binary data is made up of individual bits, which can have one of two states, commonly referred to as a "0" (zero) and a "1" (one.) These states can also be referred to as the ON and OFF states, or the HIGH and LOW states. Binary data is the simplest form of pulse-amplitude modulated (PAM) data, and can be specifically referred to as PAM2 or NRZ (no return to zero.) PAM2 or NRZ data can be transmitted using a full scale output of a transmitter. For example, where a transmitter has a fixed maximum swing, NRZ or PAM2 data can be transmitted using that maximum swing. Other PAM modulated data can have three, four, or more than four levels. Binary data can be encoded as PAM data having more than two levels, and the multilevel PAM data can be decoded back to binary data.

While computers typically have not performed computations on data having more than two levels, such data can be transmitted between devices using traces on printed circuit boards, over cables, or using other media. With the need for new communication protocols that support higher data rates over cables between systems, or over traces between circuits, the use of more complex signaling to achieve higher data bandwidth across physical interconnections is desired.

These cables can include connector inserts at each end, where the connector inserts can be inserted into corresponding connector receptacles on each computer or computing device. Cables can include a number of conductors, where each conductor is attached or otherwise coupled to a contact or pin in the connector inserts at each end. These conductors can include wires, coaxial cables, or other types of conductors.

But these structures can attenuate, distort, filter, or degrade the data signals being conveyed. For example, these structures can attenuate a signal causing signal loss. They can induce cross-talk and they can also induce reflections that further degrade the signal. That is, the cable, including its conductors and connector inserts, along with the connector receptacles and associated structures in each computer or computing device, can form a physical channel that can attenuate, distort, filter, and degrade signals being conveyed through the physical channel.

Such a lossy channel with its attendant noise can limit data bandwidth of the channel (that is, the high frequency data transmission rate), thereby forcing transmission data rate limits, reductions, and slowing transfers of data files and packets. It can also lead to data errors that can necessitate the re-transmission of data. The slowed and repeated data transmissions can lower data bandwidth, slow system response, expend wasted power, and frustrate users. Accordingly, it can be desirable to have improved encoding methods to overcome these limitations.

Thus, what is needed are circuits, signaling methods, and apparatus that provide improved data encoding for data transmitted through a physical channel.

SUMMARY

Accordingly, embodiments of the present invention can provide circuits, signaling methods, and apparatus that provide improved data encoding for data transmitted through a physical channel. An illustrative embodiment of the present invention can provide circuits, signaling methods, and apparatus that can encode data to more fully utilize a signal-to-noise profile of a physical channel. This signaling design can be optimized for a reference channel in the design of a given interface. Alternatively, encoding can be adaptive at run time. Either approach can help to increase a data rate through the physical channel. That is, optimized multi-phase-multi-level signaling can be used to more fully utilize a given physical channel having specific signal-to-noise ratio (SNR) versus frequency characteristics. For example, specific characteristics of a physical channel can be determined, either at the time of the interface design or at run time. Data can then be encoded in a manner that best utilizes the physical channel having these determined specific characteristics.

A physical channel can attenuate, distort, filter, or degrade a data signal being conveyed. For example, physical channels can attenuate a signal causing signal loss. They can also induce cross-talk. They can also induce reflections that further degrade the signal. That is, the cable, including its conductors and connector inserts, along with the connector receptacles and associated structures in each computer or computing device, can form a physical channel that can attenuate, distort, filter, and degrade signals being conveyed through the physical channel.

Typically, the attenuation caused by a physical channel can increase with frequency. Crosstalk and reflections can also generally increase as frequency rises. Accordingly, an amplitude of a full scale signal (such as a PAM2 or NRZ signal) can be reduced with higher frequency due to attenuation, while noise can increase with increased frequency due to crosstalk and reflections. The integration of analog white Gaussian noise over the channel bandwidth can further degrade a signal. The signal attenuation, when combined with the channel noise, can result in a full-scale SNR over frequency that generally decreases with increasing frequency. This decrease in the SNR over frequency can often be quite dramatic. Lower-frequency signal components, such as those below the Nyquist frequency, can have a higher SNR, but this might not materially improve the overall bit-error rate (BER). Further, the higher SNR might be in excess of what is needed and can therefore be a lost data bandwidth opportunity. Accordingly, embodiments of the present invention can optimize the use of the full scale SNR versus frequency to improve the data bandwidth of the channel. This optimization can take advantage of a high SNR at low frequency by sending signal components that have more levels. For example, signal components using PAMn signaling, where n is greater than two, can be transmitted. More generally, the signal amplitude-to-noise-ratio can be made to be relatively constant across the frequency range by adjusting the signal amplitude (or number of levels) as a function of frequency. As a result, at lower frequencies, more data per unit of bandwidth can be transmitted by using more levels, while at higher frequencies less data per unit of bandwidth is transmitted by using fewer levels. This can allow the capture of more the channel capacity while maintaining a given BER.

In these and other embodiments of the present invention, binary data can be encoded as paths through a signaling symbol where LOG 2 (Path Count) is the number of bits that can be encoded, where LOG 2 is the base 2 logarithm and Path Count is the number of possible paths through allowed transitions in a symbol. Each signaling symbol can be formed of a series of allowed transitions or non-transitions.

A non-transition can be transition of step size 0 levels and can be an element in the set of transitions and a transition type. Transitions in a symbol can have a magnitude that is an odd multiple of a quantum step resolution, where the quantum step resolutions for two or more of the transitions can be different. The resolving time for each transition having a different quantum step resolution can be different as well. The magnitude of a given transition, such as the start level and stop level, can be expressed as a fraction of a full scale dynamic range. The full scale value or dynamic range can be the maximum voltage swing (or a portion thereof) that can be provided by a transmitter, it can be the maximum signal voltage swing received by a receiver, or it can have another amplitude value. A resolving time of a transition can be the time allocated to a transition to ensure that the transition is correctly received by a receiver such that it can be decoded. A resolving time of a transition can be limited by the time interval required for the attenuation and noise at the corresponding frequency to have a SNR ratio that enables BER target (for a transition of that magnitude) to be met in the recovered data encoded with that quantum step resolution.

The resolving time of a given transition might not preclude a transition having a larger quantum step resolution from being transmitted during the resolving time of a transition having a smaller quantum step resolution. For example, an initial transition with a ⅛ full scale quantum step resolution can be concurrent with a transition with a magnitude having a ¼ full scale quantum step resolution, as long as next subsequent transition is spaced by the resolving time of a ⅛ full-scale quantum step resolution. That is, a first transition can be concurrent with a second transition having a larger quantum step resolution so long as the next subsequent transition is spaced by the resolving time of the first transition having the smaller quantum step resolution.

Also, when multiple sequential transitions are concurrent with a single concurrent transition, the multiple sequential transitions can have a larger quantum step resolution than the quantum step resolution of the single concurrent transition. That is, the sum of the resolving times of the multiple sequential transitions might be longer than the resolving time of the single concurrent transition. In this case, the single concurrent transition with the smaller quantum step resolution might need to persist or be extended until the end of the multiple sequential transitions. A transition with a ⅛ full scale quantum step resolution might not be able to be taken again until the ⅛ full scale quantum step size has met its resolving time. Similarly a ½ full scale quantum step resolution can be sent during the resolving time of the smaller quantum steps. Accordingly, the transition resolving time can be applied recursively. Further, the transition resolving time intervals for the PAMx and PAMy (where x and y are greater than 1 and different from each other) transitions can be different and they can be vertically offset at any supported quantum step resolution and overlap in time as long as each transition meets its resolving time. The result of such encoding can be a waveform that more fully utilizes the channel as compared to simply using one of PAMx or PAMy encoding alone. For example, a Fourier transform of the waveform could ideally at least approximate the bandwidth characteristics of the channel, possibly including the physical channel and circuits, such as an equalizer, a variable gain amplifier, and related circuits in a receiver.

The specific manner of encoding can be determined at least in part by characteristics of the physical channel. For example, one or more characteristics of the physical channel (and possibly related circuits as well) can be used to determine one or more encoding parameters, such as the types of PAM used in different transitions, the sets of possible transitions, the groups of sets of possible transitions, the quantum step resolutions used, the duration of a phase, the number of phases allocated to the resolving time of each quantum step resolution, and other encoding parameters.

The physical channel can be arranged in various ways. In one example, a transmitter of a first computing device can send data through a physical channel by providing data through a first connector receptacle and associated structures on the first computing device to a first connector insert of a cable. The cable can receive the data at the first connector insert at a first end of the cable and convey the data to a second connector insert at a second end of the cable. The second connector insert can then pass the data to a second connector receptacle and associated structures of a second computing device. The physical channel can thus extend from the transmitter in the first computing device to a receiver in the second computing device. The physical channel can have a non-uniform frequency response that can degrade data reception and cause errors. That is, the physical channel can have a frequency response where a gain of the physical channel varies as a function of frequency, where the gain can have a value of one, a value greater than one, or a value less than one.

Alternatively, the characteristics of the physical channel can be approximated, for example by using measurements taken on other similar physical channels. Alternatively, the characteristics of a channel can be determined by sending data from a first electronic device to a second electronic device.

Characteristics of the physical channel can be gathered in various ways. In one example, multiple tones can be transmitted through a physical channel. A first tone at a first frequency, a second tone at a second frequency, and a third tone at a third frequency can be transmitted through a physical channel. An amplitude of the received first tone can be determined, an amplitude of the received second tone can be determined, and an amplitude of the received third tone can be determined. The amplitude of the received first tone can be indicative of the DC or low-frequency gain of the physical channel. The amplitude of the second received second tone can be indicative of the gain of the physical channel near the expected maximum bandwidth, or Nyquist frequency. The third tone and tones at other frequencies, such as frequencies less than the first frequency, between the first frequency and the second frequency, or greater than the second frequency can be used instead of or as well as the first tone and the second tone. The amplitudes of the received first tone, the received second tone, and the received third tone can be used to characterize the physical channel frequency response for use in encoding data to be transmitted.

Embodiments of the present invention can implement multi-phase-level signaling using an analog-to-digital convertor (ADC) based receiver. The front end of ADC can have a relatively small dynamic range to increase resolution for small signal amplitudes. The ADC can be coupled to receive an output from a multistage continuous-time linear equalizer (CTLE.) The use of a multistage CTLE can allow sufficient equalization of the frequency response of the channel. This can help to capture the signal while minimizing the ratio of the ADC quantum noise to the captured signal. Alternatively, sample-and-hold circuits can be used for discrete time signal processing. The transmitter can use a DAC, which can synthesize the transitions that are used in the signal encoding. Embodiments of the present invention can send a full scale signal without the transmitter needing a feed-forward equalizer. This avoids post-cursors or precursors which can cost signal strength in the main tap of the feed-forward equalizer (commonly referred to as the "Co" coefficient.) An ADC receiver topology can allow the use of receiver side finite-impulse response (FIR) filters to remove precursors and post-cursors of the channel prior to signal decoding. Circuitry following the ADC in the receiver can compute finite differences with various baselines composed of phase steps, described below. The set of finite differences over the quantum step resolutions resolving time can inform the receiver about the recovered paths.

When all of the quantum step resolutions of pending transitions are resolved, the path at that phase can be resolved and the process moves to the next relevant phase for its subsequent resolution. The absolute level of the signal can also be employed in the receiver in order to prevent drift due to accumulated step size errors. These two actions can be executed in a closed loop with identified error terms being nulled. At high rates, the finite difference can have the advantage that lower frequency noise can be common to multiple high rate samples, which can lower the impact of the additive while Gaussian noise (AWGN) in those frequency regions. Level sending in contrast might not have accumulated errors of finite differences. These finite differences at various phase counts and levels can be weighted and applied in closed loop to optimize bit-error rate (BER) in recovery. Because the samples are available it can be possible to wait for decisions until all pending quantum steps are resolved for a given recovered phase. It is noted that only no-return to zero or binary operates at the highest frequency of the channel where data content is conveyed. The higher level codes, utilize more phases, so the ADC function does not need to sample the waveform at full resolution at the phase rate. The ADC can sample the channel at a rate that can then be interpolated for the various phase counts of given quantum steps where the higher resolutions have more phases and thus lower frequency content. Thus, the ADC can optimize how it recovers the quantum step resolutions over frequency—including down sampling and noise management—to realize the SNR over frequency for each quantum step. This procedure can be simpler than attempting to recover the signal by sampling at the finest resolution and at the highest phase rate.

In these and other embodiments of the present invention, the receiver can determine the finite differences for each phase across the resolution times that the encoder employs. These resolution times can either be known by being included in the signaling transition design, or they can be adaptively communicated during training or at another time. Transitions having larger quantum step resolutions can be resolved with, for example a 7 phase resolving time for a full scale transition. A smaller magnitude transition having a ½ full scale value can be resolved in an 8 phase resolution time. Accordingly, the finite difference across 8 phases can be examined to determine if it is possibly a recoverable state. Again, when using an ADC on the receiver, the final determination can be delayed until the status on any unresolved transitions having a smaller quantum step resolution that might be pending is determined. It might be known after 8 phases that data has transitioned, though additional phases might be needed. For example, up to 14 additional phases might be needed when a previous transition having a ⅛ full scale quantum step resolution was applied. If 14 phases is the longest resolution time, it can be determined that all the information to ascertain the state of that sample 14 phases earlier is known. It should be noted that the line can transition again even after the ½ scale transition. This second transition having a ½ scale quantum step resolution can resolve in another 8 phases, for a total of 16 phases. This can provide for the recovery of path transitions at larger quantum step resolutions while waiting for transitions having smaller quantum step resolutions to resolve. The decision logic can weigh the level and finite difference as quantum step resolutions timeout to determine the most probable path the signal traversed and assign it in the signaling symbol transition.

A receiver can include various circuits that can be tuned or adjusted in various ways. For example, a receiver can include a continuous-time front end (CTFE), which can include an equalizer (such as a CTLE) and other circuits, such as a variable-gain amplifier. These circuits in the electrical channel can be adjusted to compensate for the non-ideal physical channel. The combination of the physical channel and the adjusted electrical channel in the receiving circuitry can provide for a combined channel frequency response that is more consistent and uniform than the frequency response of the physical channel and the transmitter.

These and other embodiments of the present invention can provide a method of signal encoding data. Initially, one or more characteristics of a combined channel can be determined. The one or more combined channel characteristics can be a bandwidth of the combined channel, the gain of the combined channel at specific frequencies or one or more ranges of frequencies, or other characteristics. The one or more combined channel characteristics can then be used to signal encode data to more fully utilize the combined channel. This can help to increase a data rate through the combined channel.

These and other embodiments of the present invention can provide simple and efficient circuits for encoding data. This can reduce component size, save power, speed design, and improve yields. While examples are shown with binary data encoded as PAM data, these and other embodiments of the present invention can utilize different types of encoding and encode different types of data other than binary data.

Embodiments of the present invention can provide circuits, signaling methods, and apparatus for data encoding that can be used in various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices. Encoded signals can be transmitted using interface circuits and connector receptacles that can provide pathways for signals and power compliant with various standards such as one of the Universal Serial Bus (USB) standards including USB Type-C, High-Definition Multimedia Interface® (HDMI), Digital Visual Interface (DVI), DisplayPort, Thunderbolt™, Lightning, test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
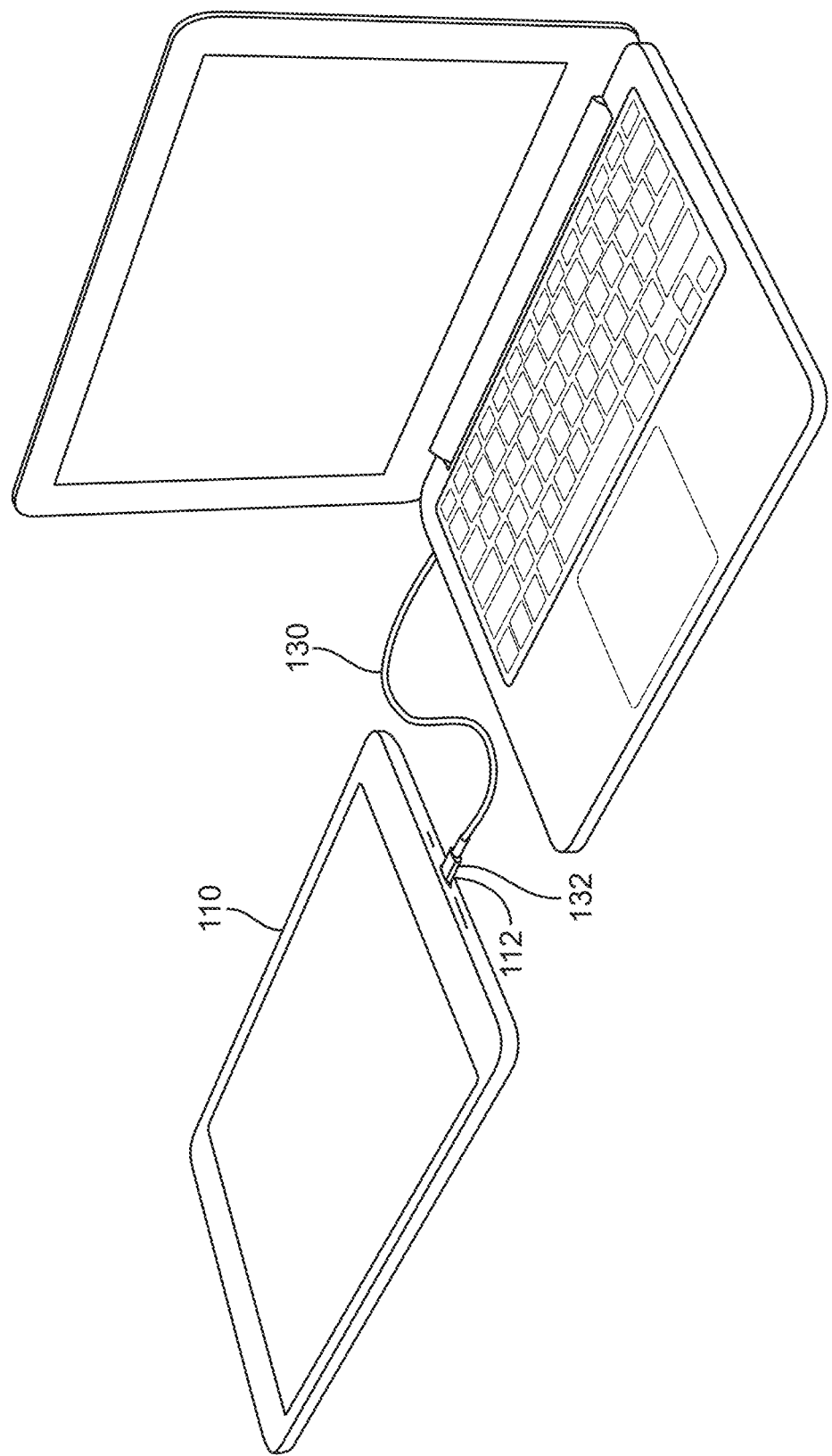
FIG. 1 illustrates an electronic system that can be improved by the incorporation of an embodiment of the present invention.

FIG. 1 illustrates an electronic system that can be improved by the incorporation of an embodiment of the present invention. This figure, as with the other included figures, is shown for illustrative purposes and does not limit either the possible embodiments of the present invention or the claims.

In this example, a first device 110 can be in communication with a second device 120 over a cable 130. Specifically, connector insert 132 on cable 130 can be inserted into connector receptacle 112 on first device 110, while a second connector insert (not shown) can be inserted into a second connector receptacle (not shown) on second device 120. First device 110 and second device 120 can communicate by sending data to each other over cable 130. First device 110 and second device 120 can share power over cable 130 as well.

Data can be transmitted between devices over a combination of a physical channel and an electrical channel. The physical channel can include passive components such as connectors and cable conduits, while the electrical channel can include transmit and receive circuits. The combination of the physical channel and the electrical channel can be referred to as the combined channel.

The physical channel can include connector receptacle 112 and connector insert 132 in first device 110, their counterparts in second device 120, and cable 130. For example, data can be sent from first device 110 to second device 120 over physical channel 220 (shown in FIG. 2.) Specifically, first device 110 can provide data through connector receptacle 112 and associated structures in first device 110, through connector insert 132, to cable 130. Cable 130 can receive the data at first connector insert 132 at a first end of cable 130 and convey the data to the second connector insert at the second end of cable 130. The second connector insert can then pass the data to the connector receptacle and associated structures of second device 120. These various structures can comprise the physical channel 220 used to convey data from first device 110 to second device 120.

The electrical channel can include output or transmitter 210 (shown in FIG. 2) in first device 110 and CTFE 225 in second device 120. CTFE 225 can include various circuits in various embodiments of the present invention.

Physical channel 220 can have a non-uniform or non-linear frequency response that can degrade data reception and cause errors. Accordingly, CTFE 225 in second device 120 can include an equalizer 230 (shown in FIG. 2) or other circuits, such as variable-gain amplifier 240, to compensate for the non-ideal transmitter 210 and physical channel 220. The combination of transmitter 210, physical channel 220, and CTFE 225 can provide a combined channel response that is more consistent and uniform than the frequency response of transmitter 210 and physical channel 220.

In these and other embodiments of the present invention, test tones can be transmitted by first device 110 and received by second device 120. The test tones can be at discrete frequency, they can be a swept frequency, or they can have other characteristics. The amplitudes of the received test tones can be used to adjust the CTFE 225 ahead of actual data transmission to compensate for the non-ideal characteristics of channel 220. In these and other embodiments of the present invention, the received tones, received data, and other received signals are those tones, data, and other signals that are provided as outputs by CTFE 225 and received by an amplitude detect circuit, such as amplitude detect slicer 264, peak detector 276, or other circuit or combination of circuits. An example of circuitry that can be used to implement this method is shown in the following figure.

Figure 2:
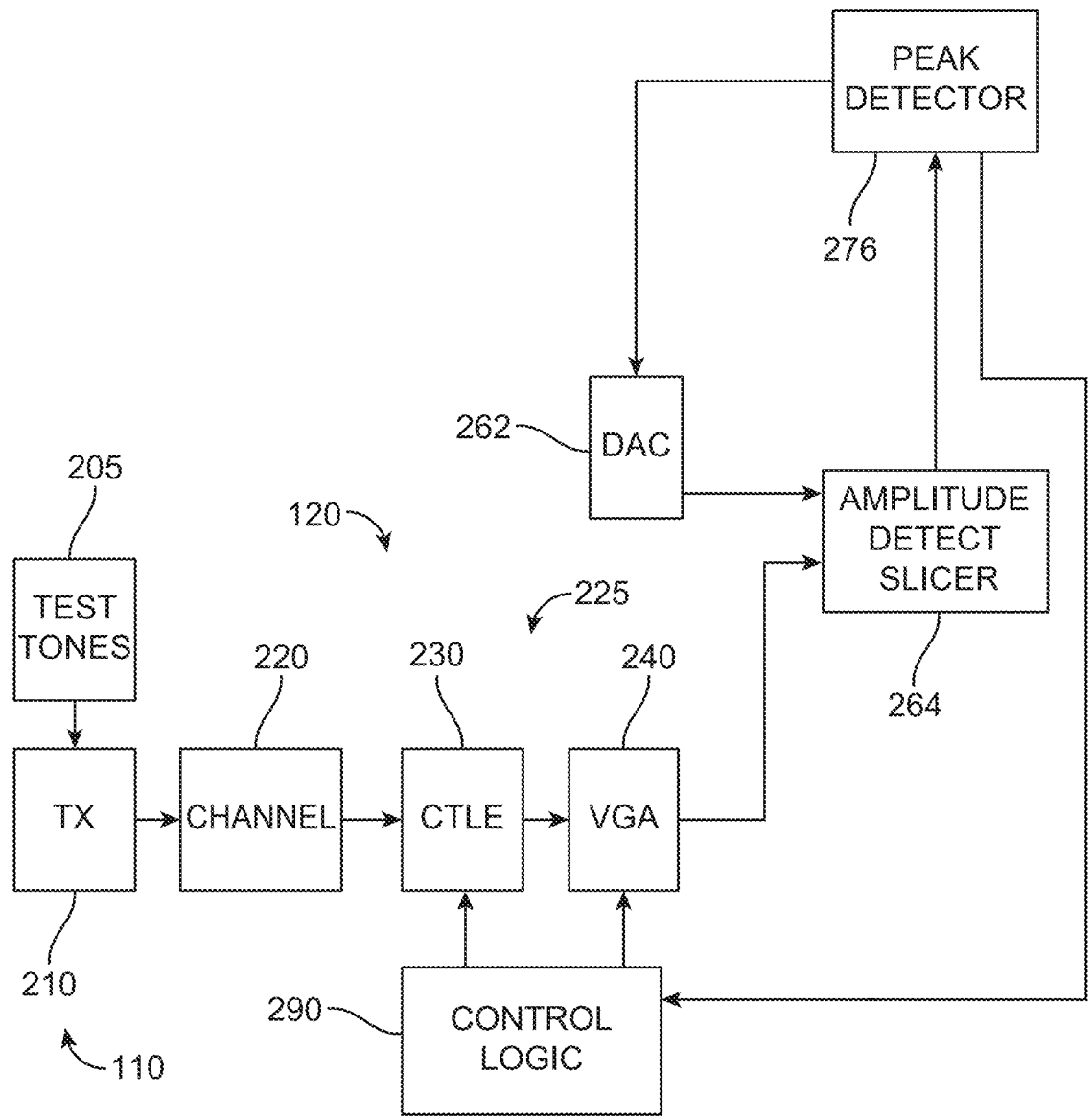
FIG. 2 is a block diagram of a portion of a data path from a first device to a second device according to an embodiment of the present invention.

FIG. 2 is a block diagram of a portion of a data path from a first device to a second device according to an embodiment of the present invention. In this example, transmitter 210 can be located in a first device 110. Transmitter 210 can send test tones 205 through physical channel 220 to receiving circuitry in second device 120. Physical channel 220 can include connector receptacle 112 and associated structures in first device 110, first connector insert 132 and cable 130 (all shown in FIG. 1), as well as a second connector insert and a connector receptacle and associated structures (not shown) of second device 120.

Transmitted test tones can be received by second device 120 by CTFE 225. CTFE 225 can include an equalizer 230. CTFE 225 can further include a variable-gain amplifier 240. CTFE 225 can include either of these and other circuits. Equalizer 230 can be a continuous-time linear equalizer or other type of equalizer. Equalizer 230 can drive variable-gain amplifier 240. CTFE 225 can be adjusted to compensate for non-ideal frequency response characteristics of transmitter 210 and physical channel 220.

The output of CTFE 225 can be received by amplitude detect slicer 264. Amplitude detect slicer 264 can compare a received signal to an output of digital-to-analog converter 262 and provide an output to peak detector 276. Peak detector 276 can provide amplitude information for received signals to control logic 290. Control logic can then adjust or tune equalizer 230 to compensate for non-ideal characteristics of channel 220.

In these and other embodiments of the present invention, one or more characteristics of CTFE 225 can be adjusted to compensate for one or more characteristics of physical channel 220. In these and other embodiments of the present invention, a de-emphasis provided by equalizer 230 and the gain of variable-gain amplifier 240 can be varied, though in these and other embodiments of the present invention, these and other characteristics of these and other circuits can be adjusted. For example, where a high-frequency gain through physical channel 220 is low relative to a low-frequency gain, the de-emphasis of equalizer 230 can be increased compensate. More specifically, a low-frequency gain of equalizer 230 can be lowered while the high-frequency gain near the Nyquist frequency remains somewhat constant, thus relatively increasing the high-frequency gain relative to the low-frequency gain. That is, the de-emphasis provided by equalizer 230 can be increased. Similarly, where a high-frequency gain through physical channel 220 is high relative to a low-frequency gain, the de-emphasis of equalizer 230 can be lowered to compensate by raising the low-frequency gain of equalizer 230. That is, the de-emphasis provided by equalizer 230 can be decreased. Where a gain through physical channel 220 is low, a gain of variable-gain amplifier 240 can be increased compensate. Similarly, where a gain through physical channel 220 is high, the gain of variable-gain amplifier 240 can be decreased to compensate.

In these and other embodiments of the present invention, adjustments to one circuit can be considered when adjusting another circuit. For example, increasing a de-emphasis of equalizer 230 can lower the gain of equalizer 230, which might need to be compensated for by increasing a gain of variable-gain amplifier 240.

The frequency response of the combined channel can be determined in various ways. For example, actual data can be transmitted through the combined channel, and amplitudes of data having specific patterns can be measured. For example, bit patterns having an unchanging level for one, two, three, or other numbers of bit times can be used. Alternatively, test patterns can be transmitted through physical channel 220, where the test patterns are known data patterns. Alternatively, a pseudo-random bit stream, such as a PRBS-11 or other pseudo-random bit stream can be transmitted through physical channel 220. Alternatively, the transmitter 210 can provide a signal having a swept frequency. That is, transmitter 210 can include a phase-locked loop (not shown) that provides an output having a frequency that is swept over a range. Alternatively, test tones at specific frequencies can be transmitted through physical channel 220. In this specific example, test tones can be generated by test tones 205 and transmitted by transmitter 210 in first device 110 over physical channel 220 to CTFE 225 in second device 120. An example of how this can be done is shown in the following figure.

Figure 3:
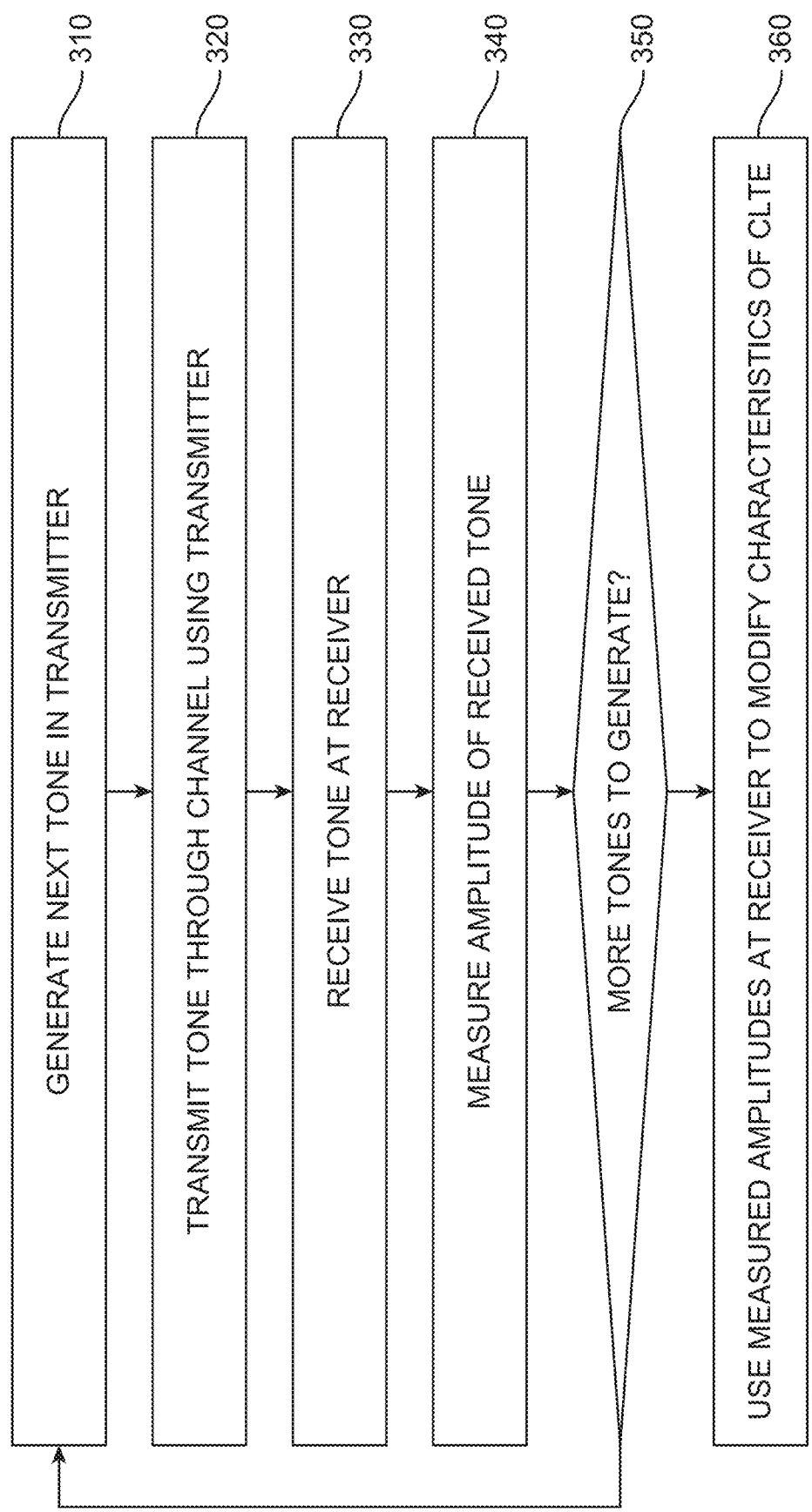
FIG. 3 illustrates a method of determining characteristics of a channel according to an embodiment of the present invention.

FIG. 3 illustrates a method of determining characteristics of a channel according to an embodiment of the present invention. In act 310, a next tone can be generated in a transmitter. This next tone can be a first tone in a sequence, it can be a subsequent tone in sequence, or it can be a single tone. In act 320, the tone can be transmitted through a channel. The tone can be received at a receiver in act 330, for example by an equalizer and variable-gain amplifier. The amplitude of the received tone can be measured in act 340. If there are more tones to generate in act 350, the above sequence of acts can be repeated. The measured amplitudes of the tones received at the receiver can then be used modify characteristics of the equalizer, the variable-gain amplifier, or both. An example is shown in the following figures.

Figure 4:
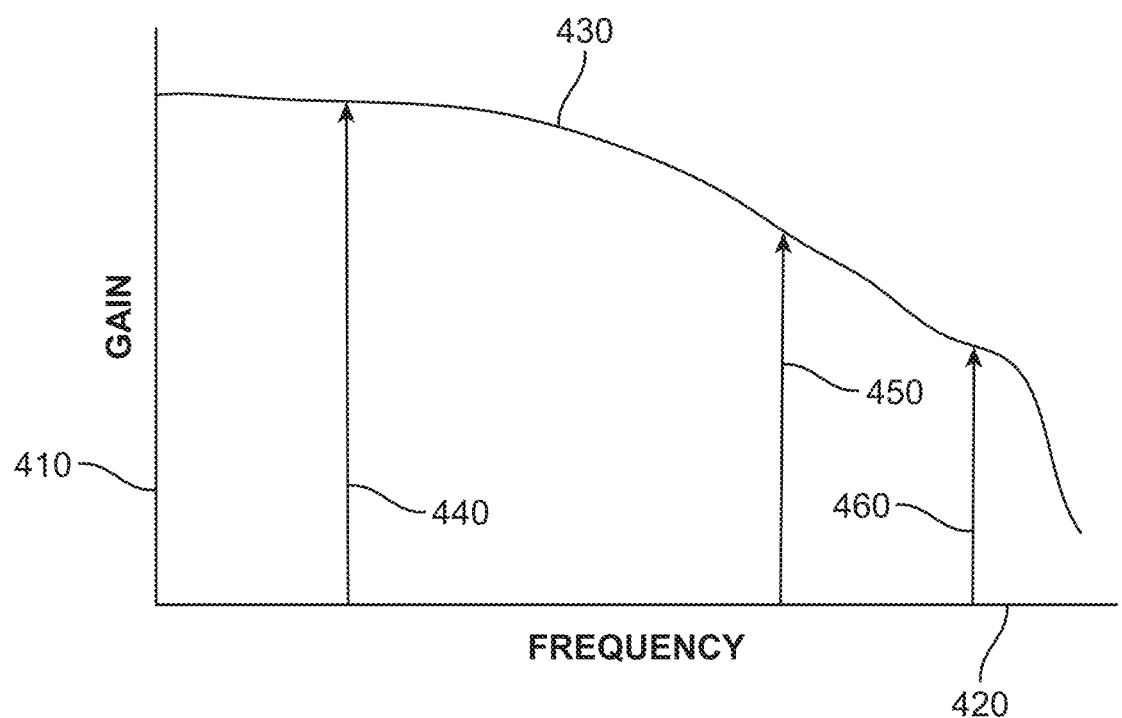
FIG. 4 illustrates a determination of a frequency response of a channel according to an embodiment of the present invention.

FIG. 4 illustrates a determination of a frequency response of a channel according to an embodiment of the present invention. This figure illustrates a gain 410 of the frequency response 430 of a transmitter 210, physical channel 220, and CTFE 225 over frequency 420. In this example, a frequency response 430 of the combined channel can be approximated by a received amplitude for tone 440, a received amplitude for tone 450, and a received amplitude for tone 460. In this example, frequency response 430 exhibits losses at tone 450 and tone 460 as compared to tone 440.

It should be noted that the combined channel frequency response 430 can be a combination of both the frequency response of physical channel 220 and a frequency response of the electrical channel including transmitter 210 and CTFE 225. Accordingly, CTFE 225 can be initially set to have a flat or null frequency response. Alternatively, settings previously provided by control logic 290 can be stored in non-volatile memory and reused. Alternatively, an initial best guess of settings for CTFE 225 can be used. Alternatively, settings at one extreme can be used as initial values. These initial settings can then be modified as necessary using amplitudes of tone 440, tone 450, and tone 460. In this example, three test tones are shown as being used. In these and other embodiments of the present invention, other numbers of tones and their relative frequencies can be used. Again, other patterns of data can be used instead of these tones. For example, bit patterns having an unchanging level for one, two, three, or other numbers of bit times can be used to determine the combined channel frequency response 430.

Figure 5:
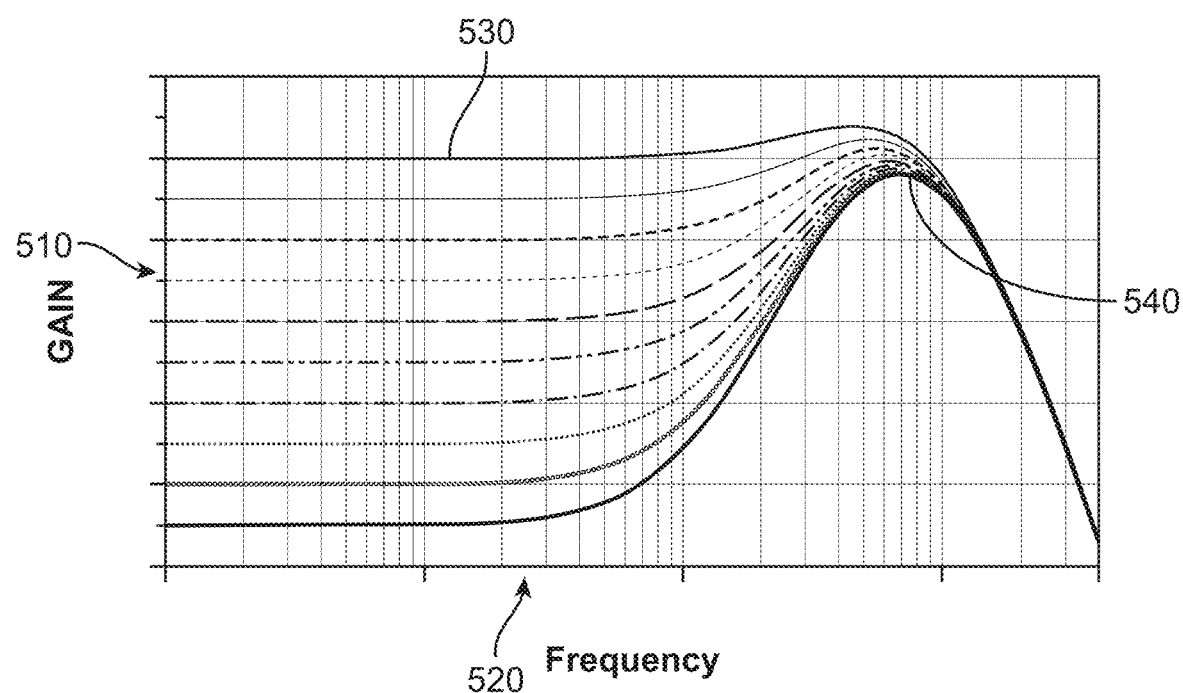
FIG. 5 illustrates characteristics of an equalizer according to an embodiment of the present invention.

FIG. 5 illustrates characteristics of an equalizer according to an embodiment of the present invention. This figure illustrates the frequency response or gain 510 over frequency 520 for an equalizer 230 (shown in FIG. 2) according to an embodiment of the present invention. Equalizer 230 can have a variable low-frequency gain 530. Changes in low-frequency gain 530 can change an amount of de-emphasis provided by equalizer 230. In this example, the de-emphasis can be the difference in gain between the low-frequency gain 530 and the gain at peak 540. In these and other embodiments of the present invention, the high-frequency gain of equalizer 230 can vary near the Nyquist frequency.

Figure 6:
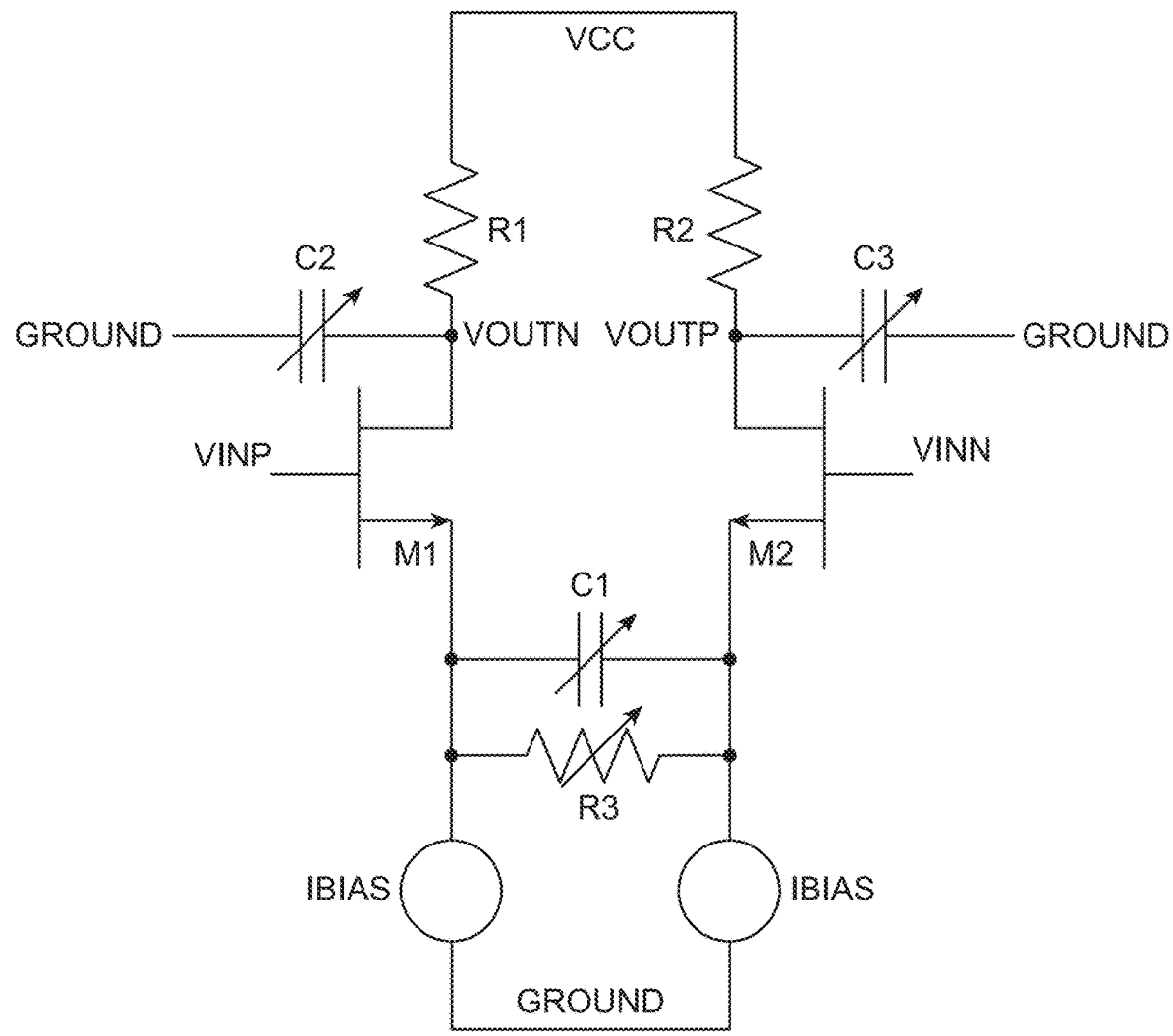
FIG. 6 illustrates a simplified equalizer according to an embodiment of the present invention.

FIG. 6 illustrates a simplified equalizer according to an embodiment of the present invention. This equalizer can be used as at least a portion of equalizer 230 (shown in FIG. 2.) In this example, a differential input signal can be received at inputs VINP and VINN at the gates of transistor M1 and transistor M2. The sources of transistor M1 and transistor M2 can be connected through capacitor C1 and resistor R3. Capacitor C1 and resistor R3 can be variable. Changes in capacitor C1 can change the high-frequency gain of the equalizer. For example, a larger capacitor C1 can reduce the impedance of the C1/R3 network and increase the gain of the equalizer at frequency. Conversely, a smaller capacitor C1 can increase the impedance of the C1/R3 network and decrease the gain of the equalizer at frequency. Changes in resistor R3 can adjust the low-frequency gain 630 of equalizer 230. For example, a larger R3 can reduce the low-frequency gain of the equalizer, while a smaller R3 can increase the gain of the equalizer. C2 and C3 can be used to adjust a high-frequency roll-off of the equalizer. A method of adjusting an equalizer, a variable-gain amplifier, or both, is shown in the following figure.

Figure 7:
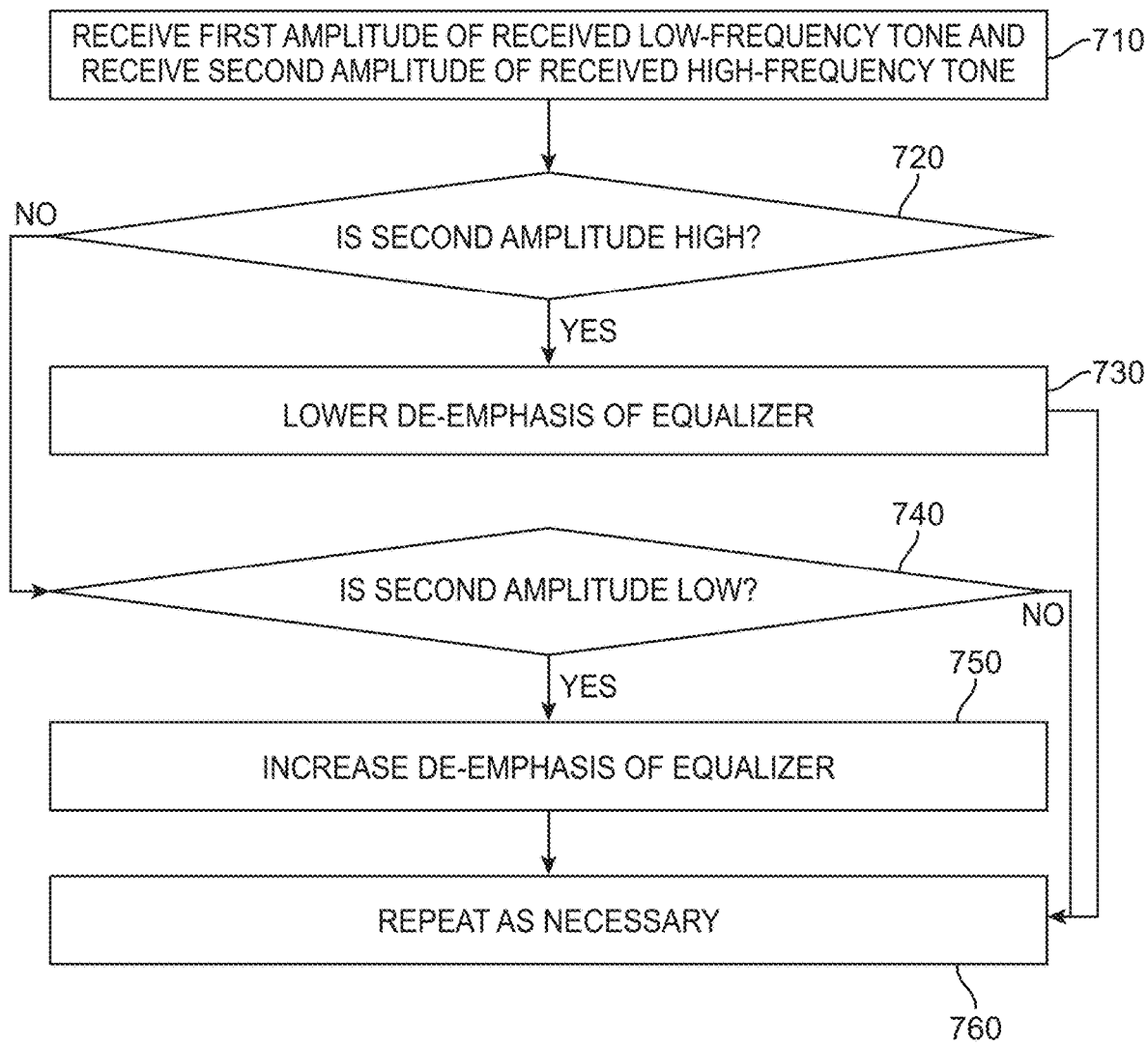
FIG. 7 illustrates a method of adjusting an equalizer and a variable-gain amplifier according to an embodiment of the present invention.

FIG. 7 illustrates a method of adjusting an equalizer and a variable-gain amplifier according to an embodiment of the present invention. In act 710, a first amplitude of a received low-frequency tone and a second amplitude of a received high-frequency tone are received by control logic, such as control logic 290 shown in FIG. 2. In act 720, it is determined whether the second amplitude is excessive. If it is, then the de-emphasis provided by an equalizer can be reduced in act 730. Again, this can be done by increasing a low-frequency gain 530 (shown in FIG. 5) of the equalizer 230 (shown in FIG. 2.) Conversely, if the second amplitude is low, the de-emphasis provided by the equalizer can be increased in act 750. Again, this can be done by decreasing the low-frequency gain 530 of the equalizer. These steps can be repeated as necessary in act 760.

Figure 8:
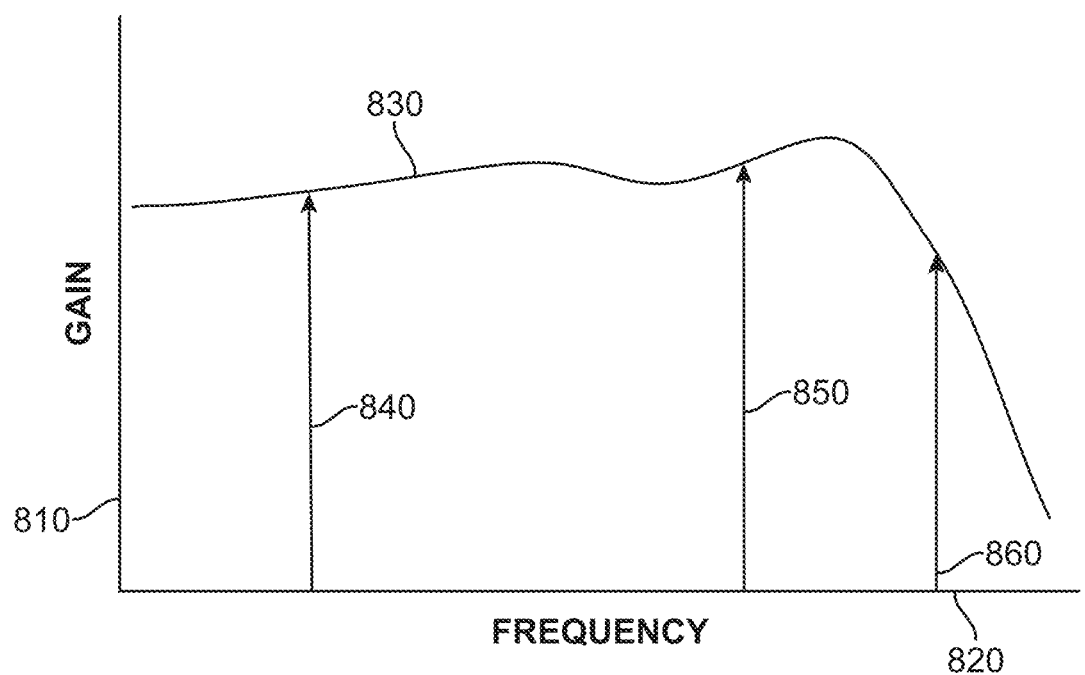
FIG. 8 illustrates an improved channel frequency response according to an embodiment of the present invention.

FIG. 8 illustrates an improved channel frequency response according to an embodiment of the present invention. In this example, a gain 810 of transmitter 210, physical channel 220, and CTFE 225 can be shown as a function of frequency 820. Frequency response 830 can be approximated by amplitudes of tone 840, tone 850, and tone 860.

Once adjustments to equalizer 230 and variable-gain amplifier 240 are complete, the channel can be retested and from that the encoding to be used can be determined. An example is shown in the following figures.

Figure 9:
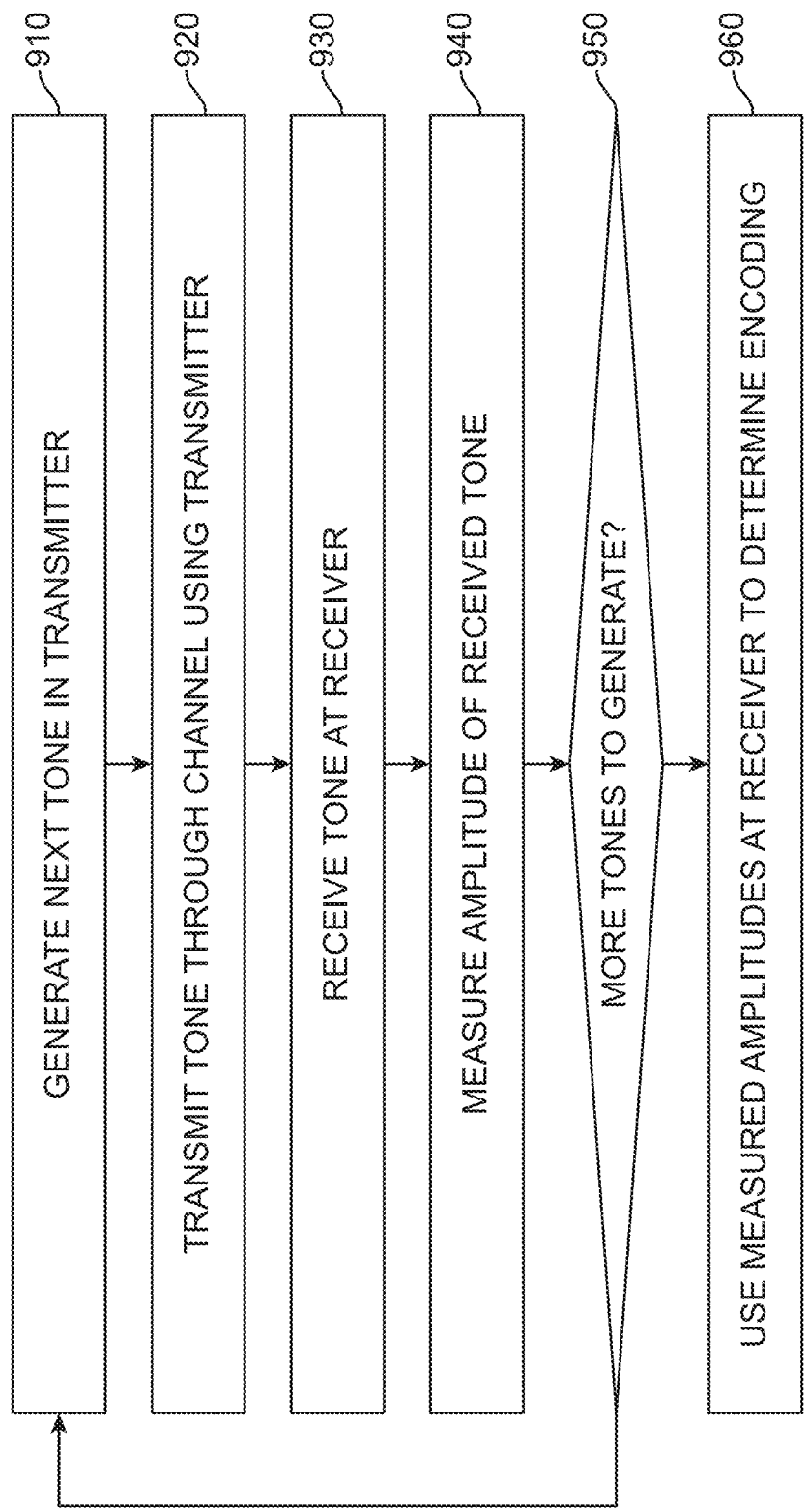
FIG. 9 illustrates a method of encoding data according to an embodiment of the present invention.

FIG. 9 illustrates a method of encoding data according to an embodiment of the present invention. In act 910, a next tone can be generated in a transmitter. This next tone can be a first tone in a sequence, it can be a subsequent tone in sequence, or it can be a single tone. In act 920, the tone can be transmitted through a channel. The tone can be received at a receiver in act 930, for example by an equalizer and variable-gain amplifier. The amplitude of the received tone can be measured in act 940. If there are more tones to generate in act 950, the above sequence of acts can be repeated. The measured amplitudes of the tones received at the receiver can then be used to encode data to be transmitted.

Figure 10:
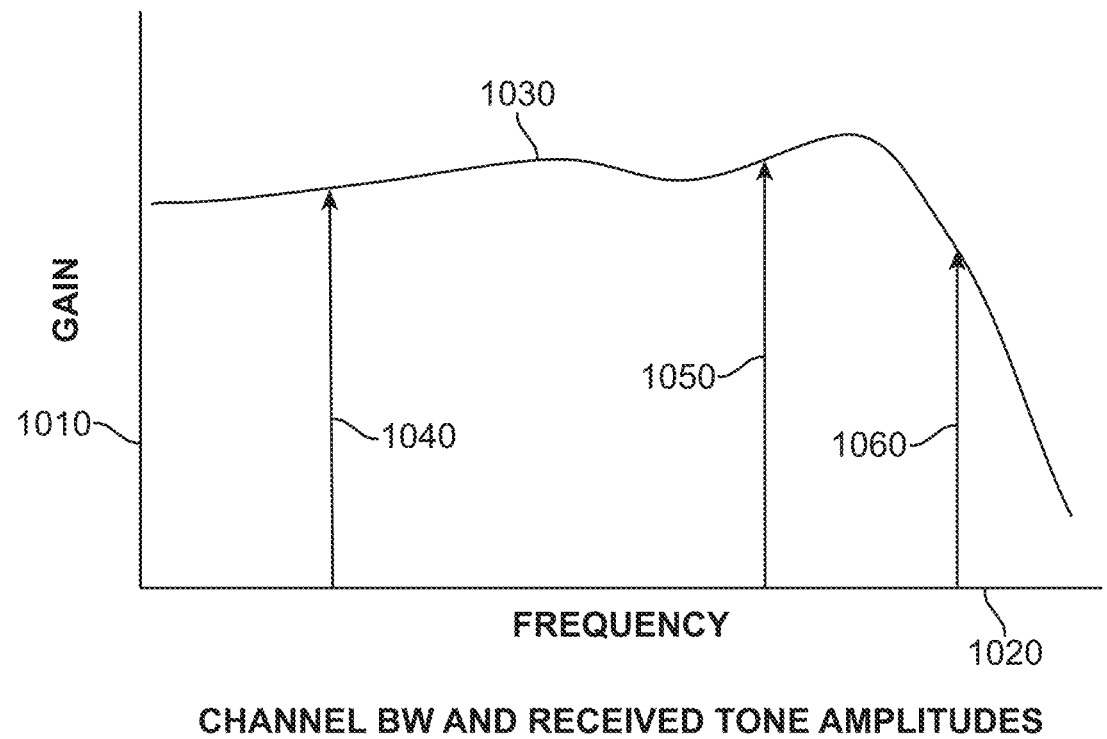
FIG. 10 illustrates a channel frequency response according to an embodiment of the present invention.

FIG. 10 illustrates a channel frequency response according to an embodiment of the present invention. In this example, a gain 1010 of channel 220 and equalizer 230 can be shown as a function of frequency 1020. Frequency response 1030 can be approximated by amplitudes of tone 1040, tone 1050, and tone 1060. The amplitudes of tone 1040, tone 1050, and tone 1060 can be used in encoding data to be transmitted.

A goal of this encoding can be to provide a data waveform, where the Fourier transform of the data waveform at least approximately matches the frequency response of the channel. This can more fully utilize the available channel bandwidth and enable higher data rates through the channel. In order to accomplish this, data can be encoded such that it has different components at different frequencies. For example, the encoded waveform can include symbols each encoded as a number of transitions, where the transitions can have different magnitudes, where the magnitudes are based on quantum step resolutions, specifically odd multiples of quantum step resolutions. Transitions can occur serially or concurrently. Transitions having smaller quantum step resolutions (which have a greater number of possible levels) can be transmitted at a lower frequency by lengthening their quantum step resolution time. Transitions with larger quantum step resolutions (which have a fewer number of possible levels) can be transmitted at a higher frequency by shortening their quantum step resolving time. Examples are shown below in FIG. 12 through FIG. 14. A method of encoding data is shown in the following figure.

Figure 11:
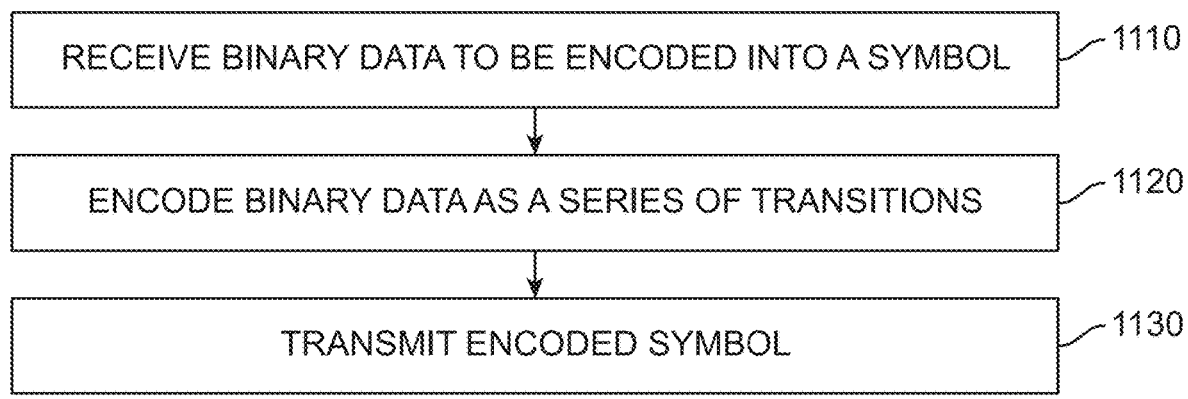
FIG. 11 illustrates a method of encoding data according to an embodiment of the present invention.

FIG. 11 illustrates a method of encoding data according to an embodiment of the present invention. In act 1110, binary data to be encoded into a symbol can be received. In act 1120, the binary data can be encoded as a number of transitions forming the symbol, where the transitions can occur sequentially and concurrently. In act 1130, the encoded symbol can be synthesized, for example by a DAC in a transmitter.

In these and other embodiments of the present invention, bits of data can be encoded as symbols. Each symbol can be formed of a number of transitions. These transitions can be temporally serial, temporally concurrent, or a combination thereof. That is, symbols can occur one after another in a sequence, multiple transitions can occur at the same time, or transitions can be arranged in a combination thereof. Each transition can have a magnitude, described here as a fraction of a full scale value, and a resolving time, which can be measured as a number of phases. The full scale value can be a voltage range through which a transmitter can provide an output voltage, or a portion thereof. Thought of another way, the full scale value can be a voltage range through which a voltage is received by a receiver, or another voltage range, though it can have other definitions. The resolving time can be the time allocated to a transition to ensure that the transition can be resolved by the receiver for decoding. For a single transition, the magnitude of a transition can the magnitude of the step from the end of a previous transition or transitions to the beginning of a subsequent transition or transitions. A magnitude can be positive for an increasing transition and negative for a decreasing transition.

Each transition can be chosen from one of a number of different sets of possible transitions. The elements (possible transitions) can be different for each of the different sets of possible transitions. The magnitudes in a set of possible transitions can be separated from each other by an odd multiple of a quantum step. One example of magnitudes of possible transitions can include ⅛, ⅜, ⅝, and ⅞ of a full scale value. Another example can include possible magnitudes ¼ and ¾. Another set can include the magnitude of ½, while another includes the magnitude of 1. Magnitudes can have also quantum step resolution that is not based on the power of two. For example, another set of magnitudes of possible transitions can include odd multiples of a ⅓ quantum step resolution and can include ⅓ and ⅔, while another set can include odd multiples of a ⅙ quantum step resolution and can include ⅙ and ⅚. Other sets of possible magnitudes can be provided by embodiments of the present invention, the above listing, and the other listings herein, are shown for exemplary purposes. In these and other embodiments of the present invention, possible transitions are selected to be unique. For example, ⅙ and ⅚ can be chosen for a set of transitions, while ³⁄₆—an odd multiple of ⅙—has the same value as ½, which is in another set of transitions, is omitted from the set. Accordingly, a set of possible transitions can be selected as being odd multiples of a quantum step resolution that are unique and not having the same value as another element in another set of transitions being used.

The resolutions of the quantum steps can be different for each of these different sets of possible transitions. That is, each different set of possible transitions can have a different quantum step resolution. In the above example of the set including ⅛, ⅜, ⅝, and ⅞ of a full scale value, the quantum step resolution can be ⅛. In the above set including ¼ and ¾, the quantum step resolution can be ¼. In the above set including ⅙ and ⅚, the quantum step resolution can be ⅙. In the above set including ⅓ and ⅔, the quantum step resolution can be ⅓. In the above set including ½, the quantum step resolution can be ½. In the above set including 1, the quantum step resolution can be 1. In these and other embodiments of the present invention, other sets including other elements having other quantum step resolutions can be included, some of the above sets can be omitted, or a combination thereof can be implemented.

These different quantum step resolutions can have different resolving times, where transitions having a smaller quantum step resolution can have a longer resolving time and transitions having a larger quantum step resolution can have a shorter resolving time. For concurrent transitions, the transition having a larger quantum step resolution (with shorter resolving time) can be sent during the resolving time of a smaller quantum step resolution (with a longer resolving time). Different transitions sharing a quantum step resolution can have the same resolving time.

Figure 12:
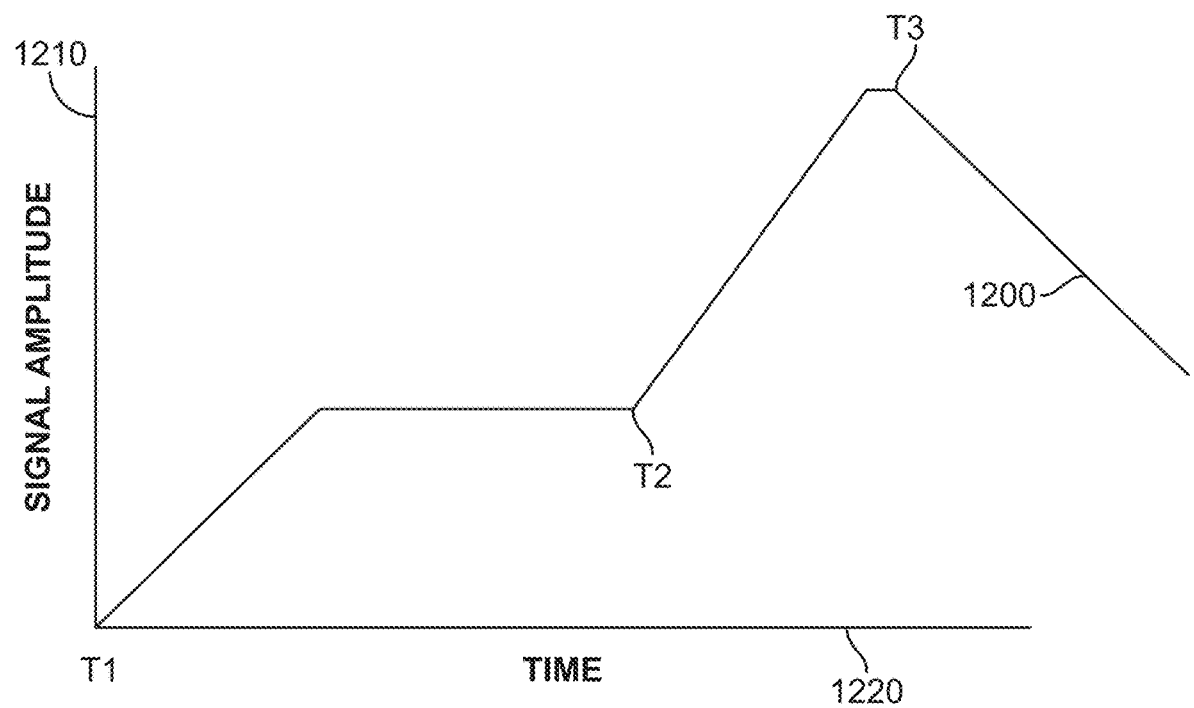
FIG. 12 illustrates an example of a portion of a symbol according to an embodiment of the present invention.

FIG. 12 illustrates an example of a portion of a symbol according to an embodiment of the present invention. A signal amplitude 1210 of a portion of a symbol 1200 is shown as a function of time 1220. In this example, a symbol can be formed of a first transition starting at time T1 with a 0 full scale value and ending at a ⅜ full scale value at time T2, followed by a second transition starting at the ⅜ full scale value at T2 and ending at a ⅞ full scale value at T3, followed by other transitions. In this example, the first transition was chosen from a first set of possible transitions having an odd multiple of ⅛ full scale quantum steps, while the second transition was chosen from a second set of possible transitions having ½ quantum step resolution. These two sets of possible transitions can be different. The possible transitions in the first set of possible transitions can be separated by a ⅛ quantum step resolution, while the possible transitions in the second set of possible transitions can be separated by a ½ quantum step resolution. The quantum step resolution can be different for each of these two different sets of possible transitions. These two transitions can have different resolving times. The first transition can have a resolving time of 14 phases, the second transition can have a resolving time of 8 phases. That is, the time from T1 to T2 can be 14 phases, while the time from T2 to T3 can be 8 phases, or 22 phases in total. The transition magnitudes, directions, and resolving times shown in these examples are for illustrative purposes.

Figure 13:
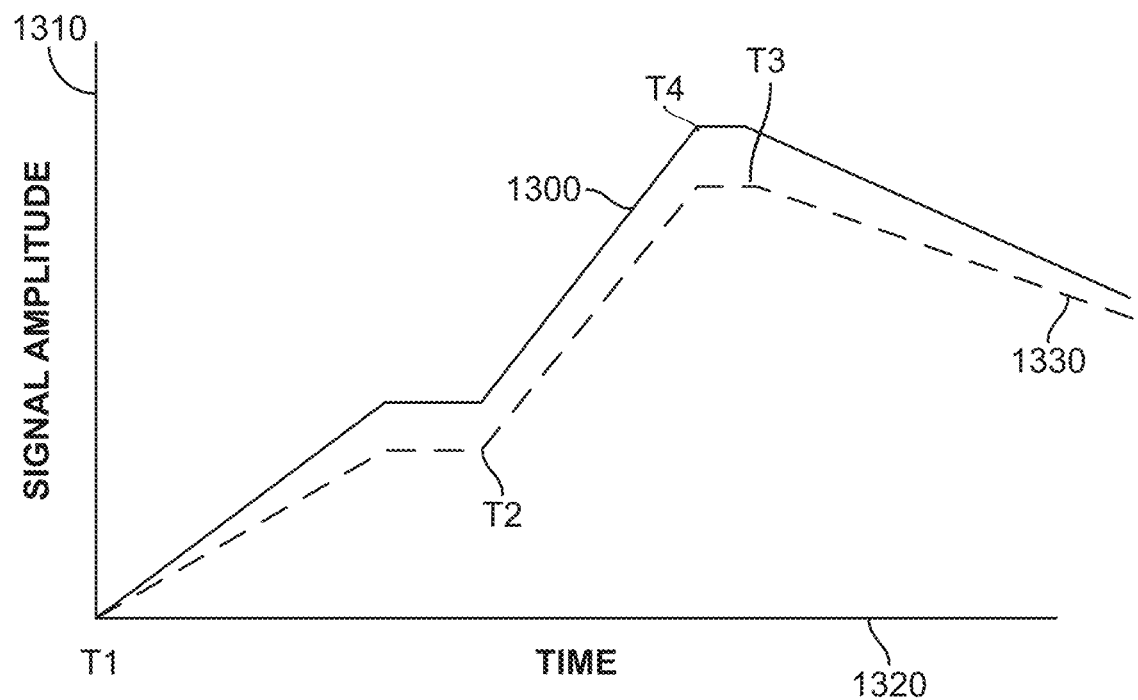
FIG. 13 illustrates another example of a portion of a symbol according to an embodiment of the present invention.

FIG. 13 illustrates another example of a portion of another symbol according to an embodiment of the present invention. A signal amplitude 1310 of a portion of a symbol 1300 is shown as a function of time 1320. In this example, a symbol can be formed of a first transition starting at time T1 with a 0 full scale value ending with a magnitude of ¼ full scale value at time T2, followed by a second transition with a magnitude of ½ full scale value (8 phases) starting at T2 and ending at T3. Further transitions can occur after T2. The first transition can have a resolving time of 10 phases, while the larger magnitude second transition can have a shorter resolving time of 8 phases. These transitions are shown as dashed lines 1330.

In this example, a concurrent third transition having a magnitude of ⅛ full scale value can occur concurrently with the first transition and can persist until the end of the second transition—that is, after 18 phases at time T3. The concurrent third transition can have a resolving time of 14 phases shown here at T4. This allows the concurrent third transition to be resolved by the end of the second transition at 18 phases. That is, at the end of the second serial transition, the finer resolution concurrent transition has met its resolving time of 14 phases, as has the two serial first and second transitions, each in turn. During decoding, a receiver can determine that the ¼ full scale and ½ full scale transitions were offset by the concurrent third transition of ⅛ full scale. In general the third concurrent transition can be either sign and have a magnitude of an odd multiple of a quantum step resolution, such as ⅛ in this example.

Figure 14:
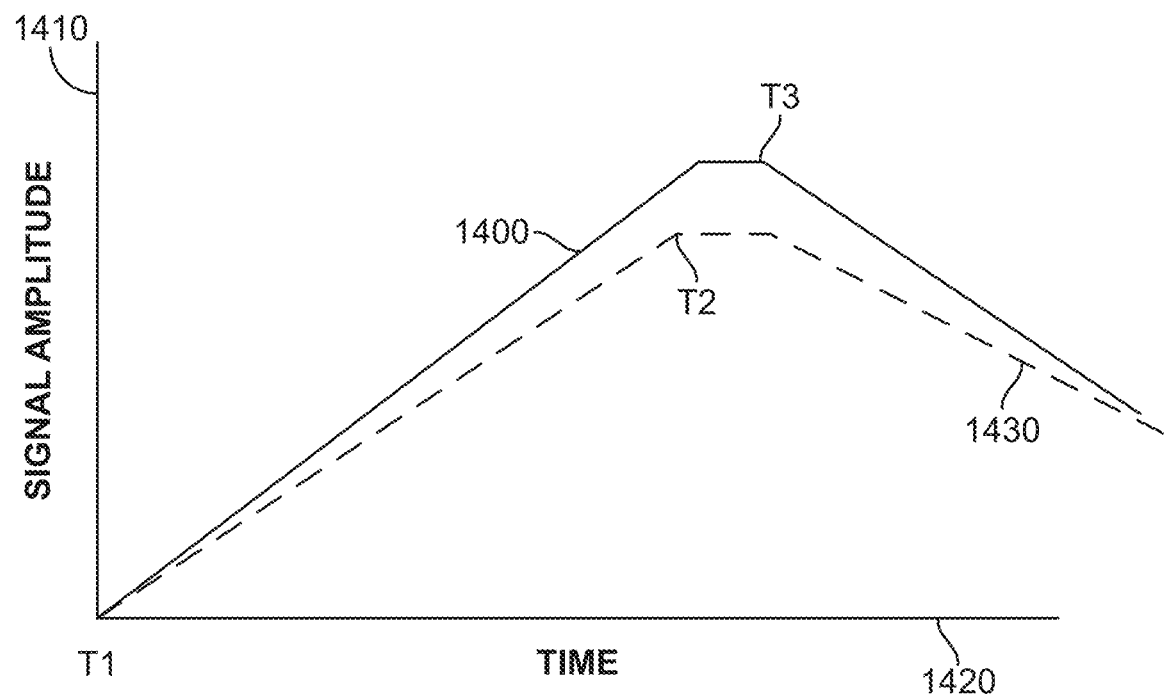
FIG. 14 illustrates another example of a portion of a symbol according to an embodiment of the present invention.

FIG. 14 illustrates another example of a portion of another symbol according to an embodiment of the present invention. A signal amplitude 1410 of a portion of a symbol 1400 is shown as a function of time 1420. In this example, a symbol can be formed of a first transition starting at time T1 with a 0 full scale value ending with a magnitude of ½ full scale value at time T2. This transition can have a resolving time of 8 phases. Further transitions can occur after T2. This transition is shown as dashed lines 1430. In this example, a concurrent second transition having a magnitude of ⅛ full scale value can occur concurrently with the first transition. The concurrent second transition can have a resolving time of 14 phases shown here at T3. This allows the first transition to be resolved by the end of the concurrent second transition at 14 phases. That is, at the end of the second concurrent transition, the larger resolution concurrent transition has met its resolving time of 8 phases. During decoding, a receiver can determine that the ½ full scale transition was offset by the concurrent second transition of ⅛ full scale. In general the second concurrent transition can be either sign and have a magnitude of an odd multiple of a quantum step resolution, such as ⅛ in this example.

In these and other embodiments of the present invention, each transition in a symbol can have a magnitude comprised of one of a set of possible magnitudes defined by an odd multiple of a quantum step resolution. The magnitude can have either sign for increasing or decreasing transitions. The quantum step resolution can be different for some of the transitions. For example, the transitions can include PAM2 (1 step level), PAM3 (2 step levels), PAM5 (4 step levels), and PAM9 (8 step levels) transitions. For PAM2, the possible levels can include a magnitude of 1 full scale value. For PAM3, the possible levels can include a magnitude of ½ full scale value. For PAM5, the possible levels can include magnitudes of ¼ and ¾ full scale values. For PAM9, the possible levels can include magnitudes of ⅛, ⅜, ⅝, and ⅞ full scale values. Symbols can also include transitions that include PAM4 (3 step levels) and PAM7 (6 step levels) transitions. For PAM4, the possible levels can include magnitudes of ⅓ and ⅔ full scale values. For PAM7, the possible levels can include magnitudes of ⅙ and ⅚ full scale values. Transitions of other PAM types having other possible magnitudes can be included in symbols consistent with these and other embodiments of the present invention.

Transitions of a different PAMx (where x is 1, 2, 3, 5, 7, 9, 13 or other integer) can have different quantum step resolutions and can have a different resolving time. Each possible transition in a set of PAMx transition can have the same resolving time. For example, each PAM2 transition (possible 1.0 full scale value) can have a resolving time of 7 phases, each PAM3 transition (possible ½ full scale value) can have a resolving time of 8 phases, each PAM5 transition (possible ¼ or ¾ full scale value) can have a resolving time of 10 phases, while each PAM9 transition (possible ⅛, ⅜, ⅝, and ⅞ full scale values) can have a resolving time of 14 phases.

Compared to conventional PAMn, embodiments of the present invention can provide multi-phase-level signaling that can have PAM3-like steps offset by, for example, 1 level of PAM8. This can not only allow a blend of each the PAMn that might be desired to be supported, but can offset of the finest quantum step resolutions supported. Further taking such a 'finest quantum offset step' might not require that no further transitions can be sent unit it is resolved, but rather only requires that larger quantum step resolutions can be used until the finer quantum step resolution is resolved. This gives a rich set of data paths per signaling symbol and thus more bits can be encoded on that symbol. In this example, each phase can be 2, 5, 10, 20, or other number of picoseconds in duration, though other numbers and lengths of phases can be implemented in various embodiments of the present invention.

Alternatively, the transitions in a symbol can include PAM2, PAM4, PAM7 and PAM13, with 1, $\frac{1}{3}$, $\frac{1}{6}$, $\frac{1}{12}$ of full scale step size transitions. These transitions can also have different quantum step resolution sizes with their different respective resolving times. Further, consecutively transmitted symbols can include different sets of quantum step size transitions. For example, a first symbol can include PAM2, PAM3, PAM5, and PAM9 step size transitions, with 1, $\frac{1}{2}$, $\frac{1}{4}$, and $\frac{1}{8}$ of full scale transitions while a second symbol can include PAM2, PAM4, PAM7, and PAM13 step size transitions with 1, $\frac{1}{3}$, $\frac{1}{6}$, $\frac{1}{12}$ of full scale step size transitions, where the common step size quantum is $\frac{1}{12}$ full scale across all possibilities. A transition of a given quantum step resolution might require that a transition's resolving time be met before a transition of that quantum step resolution can again be used. Transitions having a larger quantum step resolution can be used during that resolution time and be recoverable. An exception might be that some transitions not integrally related might not be able to be decoded. For example, transition with a $\frac{1}{6}$ full scale quantum step resolution might not be decodable if sent concurrently with a transition having a $\frac{1}{8}$ full scale quantum step resolution, since they are not integrally related, for example by a factor of 2. It should be noted that in each of these and the other examples herein, subsets or supersets of these examples can be implemented consistent with embodiments of the present invention.

More specifically, in these and other embodiments of the present invention, binary data can be encoded as a series of symbols, where each symbol is formed of a number of transitions, where the transitions can occur concurrently or sequentially. Each transition can have a magnitude that can be an odd multiple of a quantum step resolution, where the quantum step resolution has an associated resolving time. Transitions in a symbol can each have a one of a number of quantum step resolutions chosen from a set of possible quantum step resolutions (such as $\frac{1}{8}$, $\frac{1}{4}$, and $\frac{1}{2}$), and the quantum step resolutions for two or more of the transitions can be different. The resolving time for each transition having different quantum step resolution in the two or more transitions can be different as well. The resolving time for transitions having the same quantum step resolution can be the same.

In these and other embodiments of the present invention, transitions in a symbol can each have a one of a number of quantum step resolutions chosen from a set of possible quantum step resolutions (such as $\frac{1}{8}$, $\frac{1}{4}$, and $\frac{1}{2}$), and the quantum step resolutions for three or more of the transitions can be different. The resolving time for each transition having different quantum step resolution in the three or more transitions can be different as well. As before, the resolving time for transitions having the same quantum step resolution can be the same.

These and other embodiments of the present invention can encode binary data into a symbol by leveraging a state accumulation table. Such a state accumulation table can use recursion of the transition types allowed, as described above. This state accumulation table can list a sequence of transitions that can enter a given level at a given phase of the symbol. The state accumulation table can accumulate all paths that can enter that phase and level. It is noted that this can be the same pattern for a given phase relative to its earlier phases once the number of phases is reached that covers the longest resolving time. This is a state accumulation chart and it is recursive in its behavior—at least until the last stages or end of a symbol where new transitions might not be resolved by end of symbol and are therefore not allowed during encoding. The accumulation table can be plotted in reverse, since all possible cell-to-cell linkages are known, to show the number of states a given input branch can encode from a given starting point, this can aid encode strategy for decode considerations. In general the possible encoded states-per-path can be grouped to fill binary coding partitions needed. The efficiency of the encoding can determine that many paths are not needed, thereby assisting with a reduction in the encoding complexity. Each transition in the state accumulation or recursion table can be allocated to its end level and phase in one of a number of sets of levels and a corresponding phase, where each transition can have one of a number of resolving times, or one of a number of total phases that is based on the quantization of possible step levels for the transition.

In these and other embodiments of the present invention, transitions having a quantum step resolution related by a factor of 2 (such as $\frac{1}{8}$, $\frac{1}{4}$, and $\frac{1}{2}$ full scale value) can be sequentially adjacent to (though not necessarily concurrent with) transitions having a quantum step resolution related by a factor of 3 (such as $\frac{1}{3}$ or $\frac{1}{6}$.) However, switching between a transition based on $\frac{1}{8}$ full scale value and a transition based on $\frac{1}{6}$ full scale value is a $\frac{1}{24}$ full scale transition, or a PAM25 transition, which can have a long resolving time.

Accordingly, these and other embodiments of the present invention can include a first group of sets of possible transitions, including PAM2 (possible transition of 1 full scale), PAM3 (possible transition of $\frac{1}{2}$), and PAM5 (possible transitions $\frac{1}{4}$ and $\frac{3}{4}$) along with a second group of sets of possible transitions including PAM2 (possible transition of 1 full scale), PAM4 (possible transitions $\frac{1}{3}$ and $\frac{2}{3}$) and PAM7 (possible transitions of $\frac{1}{6}$ and $\frac{5}{6}$.) More specifically, the possible PAM9 transitions can be omitted. In this arrangement, a transition having a $\frac{1}{6}$ full scale quantum step resolution transitioning to a $\frac{1}{4}$ full scale quantum step resolution is a $\frac{1}{12}$ full scale transition, or a PAM13 transition, which can be resolved faster than the PAM25 transition described above. This also allows PAM13-type transitions to be included in both the first group and the second group of sets. The possible PAM13 transitions can include transitions having a quantum step resolution of $\frac{1}{12}$, $\frac{5}{12}$, $\frac{7}{12}$, and $\frac{11}{12}$ of full scale.

Where PAM13 transitions are included, encoding can include a first group of sets of possible transitions, including PAM2 (possible transition of 1 full scale), PAM3 (possible transition of $\frac{1}{2}$), and PAM5 (possible transitions of $\frac{1}{4}$ and $\frac{3}{4}$) and PAM13 (possible transitions of $\frac{1}{12}$, $\frac{5}{12}$, $\frac{7}{12}$, and $\frac{11}{12}$.) A second group of sets of possible transitions including PAM2 (possible transition of 1 full scale), PAM4 (possible transitions $\frac{1}{3}$ and $\frac{2}{3}$), PAM7 (possible transitions of $\frac{1}{6}$ and $\frac{5}{6}$), and PAM13 (possible transitions of $\frac{1}{12}$, $\frac{5}{12}$, $\frac{7}{12}$, and $\frac{11}{12}$) can be included as well. It should be note that extra resolving time might need to be allocated when switching between sets of possible transitions. For example, switching from a PAM7 to a PAM5 can be the equivalent of a PAM13 magnitude transition. That is, the difference between a $\frac{1}{6}$ full scale transition and a $\frac{1}{4}$ full scale transition has the same magnitude as a $\frac{1}{12}$ full scale transition. Such a transition can have a resolving time on the order of 18, 20, 22, 24 or other number of phases. Similarly, switching from a PAM5 to a PAM4 can be the equivalent of a PAM13 magnitude transition. That is, the difference between a ¼ full scale transition and a ⅓ full scale transition also has the same magnitude as a 1/12 full scale transition. It should be noted that switching between a PAM3 and a PAM4 has the same magnitude as a PAM7 and so can have a shorter resolving time.

These and other embodiments of the present invention can encode data using specific rules to simplify data reception. For example, once data reaches a level following a transition, a first hold time, such as a hold time of four phases, can be used to ensure that data is settled before being read. When data changes direction, a second hold time can be imposed to ensure that data is settled before changing directions. The first and second hold times can be the same or different times. These hold times can be included in the encoding state accumulation table.

Again, these and other embodiments of the present invention can transmit symbols that are a concatenated sequence of PAM encoded transitions, where the PAM encoded transitions can be encoded differently. For example, transitions can be PAM2, PAM3, PAM5, PAM9, or other types of PAM transitions. The duration of each symbol can be different. For example, each symbol can be a different multiple of a time increment, which can be referred to as a phase. Each PAM2 or full scale quantum step resolution transition can have a resolving time of 7 phases, each PAM3 transition (or ½ full scale quantum step resolution transition) can have a resolving time of 8 phases, each PAM5 transition (or ¼ full scale quantum step resolution transition) can have a resolving time of 10 phases, while each PAM9 transition (or ⅛ full scale quantum step resolution transition) can have a resolving time of 14 phases. In this example, each phase can be 2, 5, 10, 20, or other number of picoseconds in duration. In these and other embodiments of the present invention, the same or different PAM symbols having the same or different numbers of phases and having the same or different lengths of phases can be used.

Again, a Fourier transform of an encoded waveform could ideally at least approximate the bandwidth characteristics of the channel, possibly including the physical channel, the equalizer, and the variable gain amplifier as well. This can be achieved at least in part by changing one or more of the types of PAM used in different transitions, the quantum step resolutions used, the sets of possible transitions included, the groups of sets of possible transitions, the length of a phase, the number of phases allocated to each type of transition, and other parameters, as a function of one or more characteristics of the channel used to transmit data.

In these and other embodiments of the present invention, a number of transitions can be arranged serially and concurrently, and transmitted as a signaling symbol. This can simplify decoding of the transmitted data. For example, signaling symbol can be received and the signaling symbol can be decoded as a single entity.

These and other embodiments of the present invention can provide encoders and decoders that can be readily implemented using a minimal amount of logic gates. They can increase data bandwidth over a given channel, reduce component size, save power, speed design, and improve yields. While examples are shown utilizing specific numbers of bits, quantum step resolutions of transitions, and type of signal transitions, these and other embodiments of the present invention can utilize different numbers of bits, quantum step resolutions of transitions, and type of signal transitions, such as one, two, three, four, five, six, seven, eight or more quantum step level transitions in full scale peak-to-peak swing. Other types of encoding (and decoding), such as phase or frequency encoding, can also be used.

Embodiments of the present invention can provide circuits, signaling methods, and apparatus for data encoding that can be used in various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices. Encoded signals can be transmitted using interface circuits and connector receptacles that can provide pathways for signals and power compliant with various standards such as one of the Universal Serial Bus (USB) standards including USB Type-C, High-Definition Multimedia Interface® (HDMI), Digital Visual Interface (DVI), DisplayPort, Thunderbolt™, Lightning, test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of encoding data, the method comprising:
   receiving a first plurality of bits; and
   encoding the first plurality of bits as a first symbol comprising a plurality of transitions, the plurality of transitions comprising two transitions,
   wherein each transition in the plurality of transitions has a magnitude that is a multiple of a quantum step resolution, where the quantum step resolution is one in a set of possible quantum step resolutions, where each quantum step resolution in the set of possible quantum step resolutions is a different fraction of a full-scale transition, and where the quantum step resolution is different for the two transitions,
   wherein each transition in the first symbol has a resolving time consisting of a number of phases, and the number of phases is different for the two transitions, and
   wherein the magnitudes of the two transitions each comprise one of a multiple of a ½ full scale quantum step resolution, a multiple of a ¼ full scale quantum step resolution, or a multiple of a ⅛ full scale quantum step resolution.

2. The method of claim 1 wherein the resolving time for a transition having a magnitude that is a multiple of a ⅛ full scale quantum step resolution is longer than the resolving time for a transition having a magnitude that is a multiple of a ¼ full scale quantum step resolution, which is longer than the resolving time for a transition having a magnitude that is a multiple of a ½ full scale quantum step resolution.

3. The method of claim 1 wherein a transition having a magnitude that is a multiple of a ⅛ full scale quantum step resolution has a resolving time of 14 phases, a transition having a magnitude that is a multiple of a ¼ full scale quantum step resolution has a resolving time of 10 phases, and a transition having a magnitude that is a multiple of a ½ full scale quantum step resolution has a resolving time of 8 phases.

4. The method of claim 1 further comprising:
receiving a second plurality of bits; and
encoding the second plurality of bits as a second symbol, wherein the second symbol comprises one of a transition having a magnitude that is a full scale quantum step resolution, one of a transition having a magnitude that is a multiple of a ⅓ full scale quantum step resolution, and one of a transition having a magnitude that is a multiple of a ⅙ of full scale quantum step resolution.

5. The method of claim 1 wherein the first symbol further comprises one of a transition having a magnitude that is a multiple of a ⅓ full scale quantum step resolution, and one of a transition having a magnitude that is a multiple of a ⅙ of full scale quantum step resolution.

6. The method of claim 1 further comprising, before receiving data:
transmitting a first plurality of tones through a channel to a receiver;
receiving a plurality of characteristics characterizing the channel; and
using the received plurality of characteristics to determine a method of encoding the received data into symbols.

7. The method of claim 1 wherein the first plurality of bits is encoded into a symbol using a state accumulation table.

8. The method of claim 7 wherein the state accumulation table lists a sequence of transitions that can enter a given level at a given phase of the symbol.

9. The method of claim 8 wherein each transition in the sequence of transitions has a resolving time that comprises an integral number of phases.

10. The method of claim 9 wherein a first number of phases in the state accumulation table is allocated for a resolving time for a transition in the sequence of transitions.

11. The method of claim 1 wherein the two transitions are serially adjacent transitions, and wherein a third transition occurs concurrently with the two transitions and the third transition has a resolving time less than the combined resolving time of the two transitions.

12. The method of claim 11 wherein the quantum step resolution of the third transition is smaller than the quantum step resolution of either of the two transitions.

13. The method of claim 1 wherein the magnitudes of the two transitions each comprise one of a multiple of a ½ full scale quantum step resolution, an odd multiple of a ¼ full scale quantum step resolution, or an odd multiple of a ⅛ full scale quantum step resolution.

14. The method of claim 1 wherein the magnitudes of the two transitions each comprise one of an odd multiple of a ½ full scale quantum step resolution, an odd multiple of a ¼ full scale quantum step resolution, or an odd multiple of a ⅛ full scale quantum step resolution.

15. A method of encoding data, the method comprising:
receiving a first plurality of bits; and
encoding the first plurality of bits as a symbol comprising a plurality of transitions, the plurality of transitions comprising two transitions,
wherein each transition in the plurality of transitions has a magnitude that is a multiple of a quantum step resolution, where the quantum step resolution is one in a set of possible quantum step resolutions, where each quantum step resolution in the set of possible quantum step resolutions is a different fraction of a full-scale transition, and where the quantum step resolution is different for the two transitions,
wherein each transition in the symbol has a resolving time consisting of a number of phases, and the number of phases is different for the two transitions, and
wherein the magnitudes of the two transitions each comprise one of a full scale quantum step resolution, a multiple of a ⅓ full scale quantum step resolution, or a multiple of a ⅙ full scale quantum step resolution.

16. The method of claim 15 wherein the resolving time for a transition having a magnitude that is a multiple of a ⅙ full scale quantum step resolution is longer than the resolving time for a transition having a magnitude that is a multiple of a ⅓ scale quantum step resolution, which is longer than the resolving time for a transition having a magnitude that is a multiple of a full scale quantum step resolution.

17. The method of claim 15 wherein the magnitudes of the two transitions each comprise one of a full scale quantum step resolution, a multiple of a ⅓ full scale quantum step resolution, or an odd multiple of a ⅙ full scale quantum step resolution.

18. A method of encoding data, the method comprising:
receiving a first plurality of bits; and
encoding the first plurality of bits as a symbol comprising a plurality of transitions, the plurality of transitions comprising two transitions,
wherein each transition in the plurality of transitions has a magnitude that is a multiple of a quantum step resolution, where the quantum step resolution is one in a set of possible quantum step resolutions, where each quantum step resolution in the set of possible quantum step resolutions is a different fraction of a full-scale transition, and where the quantum step resolution is different for the two transitions,
wherein each transition in the symbol has a resolving time consisting of a number of phases, and the number of phases is different for the two transitions, and
wherein the magnitudes of the two transitions each comprise symbol comprises one of a multiple of a ½ full scale quantum step resolution, a multiple of a ¼ full scale quantum step resolution, a multiple of a ⅓ full scale quantum step resolution, a multiple of a ⅙ full scale quantum step resolution, or a multiple of a 1/12 full scale quantum step resolution.

19. The method of claim 18 wherein the magnitudes of the two transitions each comprise one of a multiple of a ½ full scale quantum step resolution, an odd multiple of a ¼ full scale quantum step resolution, a multiple of a ⅓ full scale quantum step resolution, an odd multiple of a ⅙ full scale quantum step resolution, or an odd multiple of a 1/12 full scale quantum step resolution.

20. The method of claim 18 wherein the magnitudes of the two transitions each comprise one of an odd multiple of a ½ full scale quantum step resolution, an odd multiple of a ¼ full scale quantum step resolution, a multiple of a ⅓ full scale quantum step resolution, an odd multiple of a ⅙ full scale quantum step resolution, or an odd multiple of a 1/12 full scale quantum step resolution.

* * * * *